Figure 1:
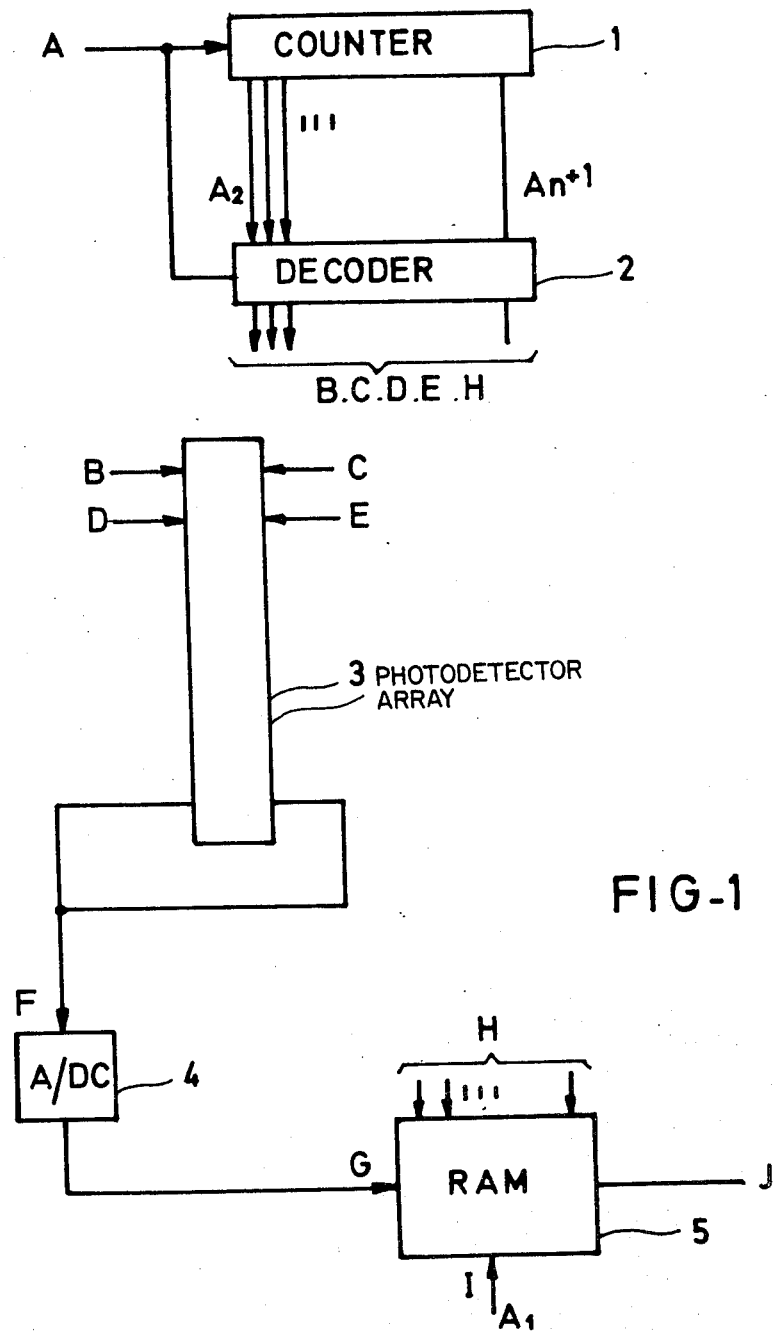

United States Patent [19]

Nadler

[11] Patent Number: 4,471,387

[45] Date of Patent: Sep. 11, 1984

[54] IMAGE SCANNING METHOD AND DEVICE

[76] Inventor: Morton Nadler, 17 Les Huppes, 78170 La Celle Saint Cloud, France

[21] Appl. No.: 339,169

[22] Filed: Jan. 13, 1982

[30] Foreign Application Priority Data

Jan. 14, 1981 [GB] United Kingdom ............... 8101128

[51] Int. Cl.³ .................... H04N 1/04; H04N 3/14
[52] U.S. Cl. ................... 358/293; 250/578; 357/24; 358/213
[58] Field of Search ............ 358/212, 213, 293, 294; 250/208, 211 J, 578; 357/24 LE, 32

[56] References Cited

U.S. PATENT DOCUMENTS

| | | | |
|---|---|---|---|
| 1,790,736 | 2/1881 | Wald | 358/212 |
| 3,660,663 | 5/1972 | Guilford et al. | 250/578 |
| 4,009,388 | 2/1977 | Seachman | 250/208 |
| 4,012,587 | 3/1977 | Ochi et al. | 357/24 |
| 4,216,503 | 8/1980 | Wiggins | 358/294 |
| 4,242,700 | 12/1980 | Weimer | 358/213 |
| 4,293,877 | 10/1981 | Tsunekawa et al. | 358/213 |

FOREIGN PATENT DOCUMENTS 52-32615  3/1977  Japan ............................. 358/293

Primary Examiner—Joseph A. Orsino, Jr.
Attorney, Agent, or Firm—Bucknam and Archer

[57] ABSTRACT

An image scanning method, comprising providing an array of intercalated odd and even detectors, said odd detectors and said even detectors being aligned parallely to a common direction, displacing said array over said image transversely to said direction, repeatedly serially sampling element signals from said detectors, each indicative of the intensity detected by a corresponding detector over an element part of the image, and serially transferring into an image signal a sequence of said element signals sampled from said odd detectors and a sequence said element signal sampled from said even detectors alternately.

8 Claims, 6 Drawing Figures

IMAGE SCANNING METHOD AND DEVICE

The invention relates to image scanning methods and devices, which can be used for producing an image signal indicative of the intensity, in particular light intensity, of adjacent points of the image, from sampling signals produced by detecting means displaced over the image.

Two types of rasters are known and used in image scanning, the orthogonal raster, where the pictures elements are sampled along two axes at right angles to each other, forming substantially square cells, and the hexagonal raster, with three axes at 60 degrees, forming hexagonal cells. The theoretical literature presents many advantages for hexagonal scans compared to orthogonal scans for certain types of image processing problems, but this scanning is not used in practice. Up to now no convenient means exists for generating hexagonal scans.

In known orthogonal scans, linear solid state arrays of photodetectors are commonly used. The scan direction orthogonal to the linear array, called the column array, is supplied by a translation of the array relative to the scanned medium in the direction orthogonal to the column. By scanning down the column repeatedly the image of the medium is dissected into the required array or raster. The relative motion between the array and the medium can be obtained by an actual physical displacement of one of them with respect to the other or by rotating mirrors, prisms, etc.

It is the object of the present invention to supply a means whereby a hexagonal raster can be generaed by the use of a column array of photodetectors, due to the use of such arrays consisting of two interdigitated series of photodetectors, namely the even and the odd half columns, each with separate clock-sampling pulses, reset circuits, and outputs. It is also an object of the present invention to supply an improved design for such arrays.

Figure 2:
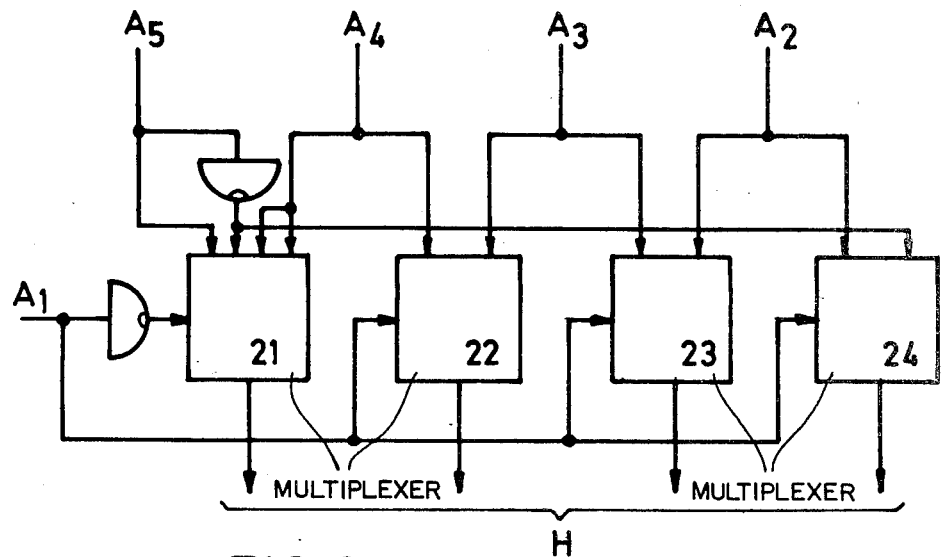
Figure 5:
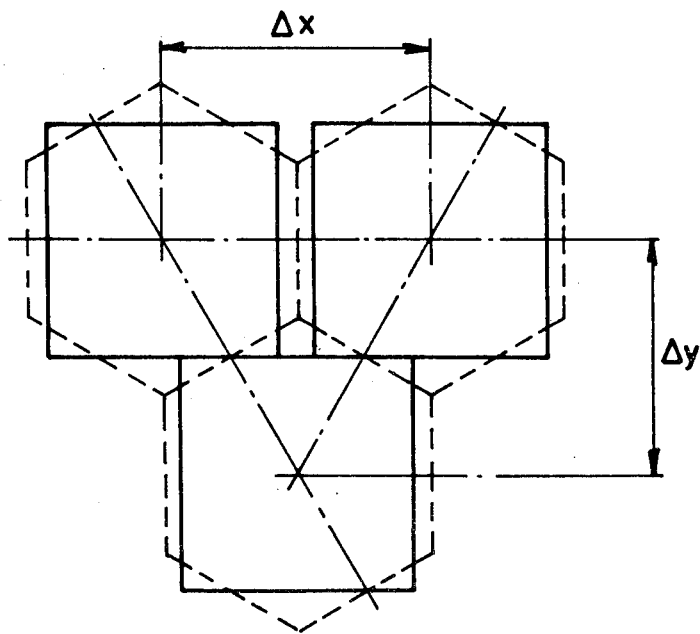
Figure 3:
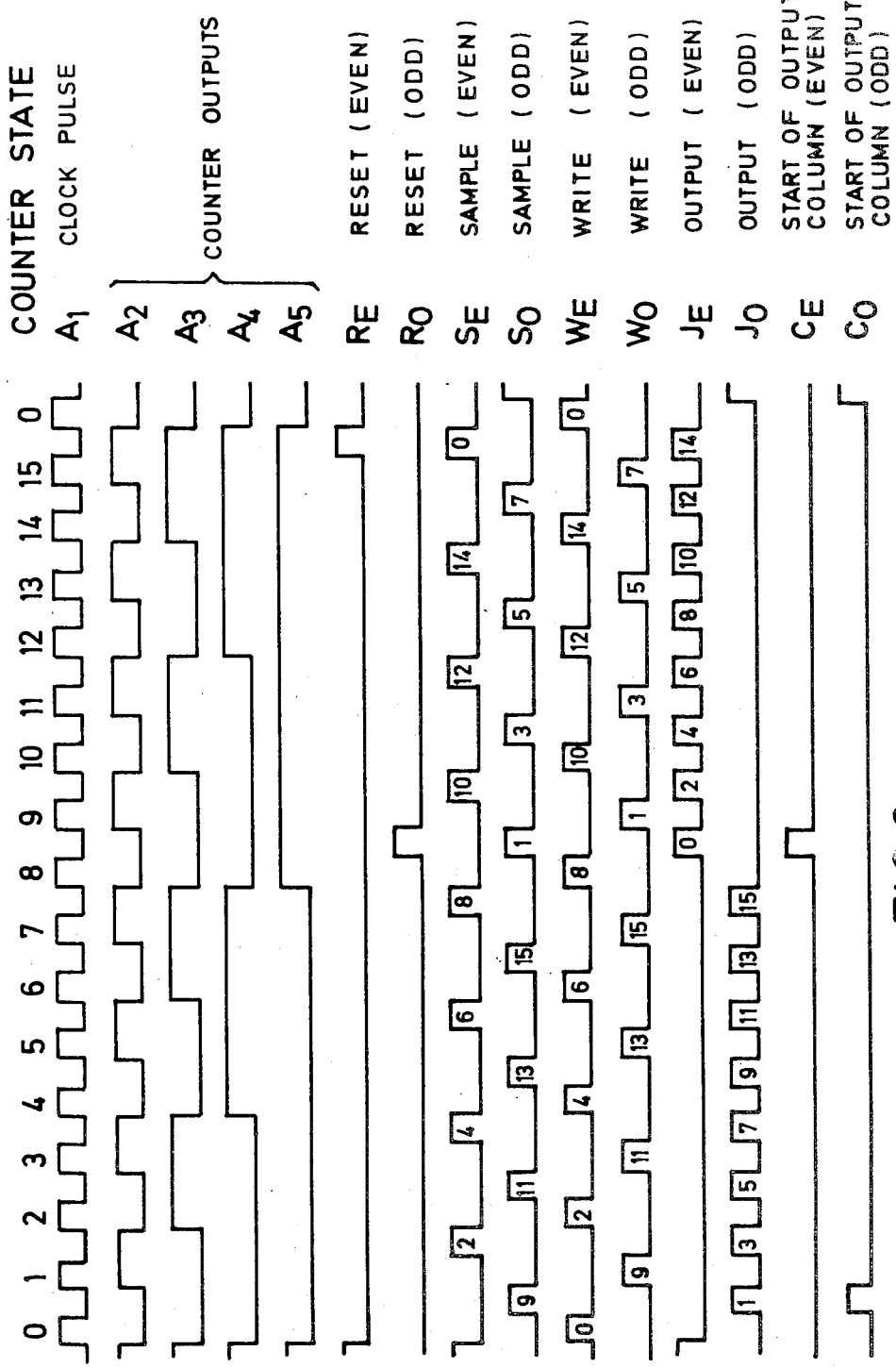
Figure 4:
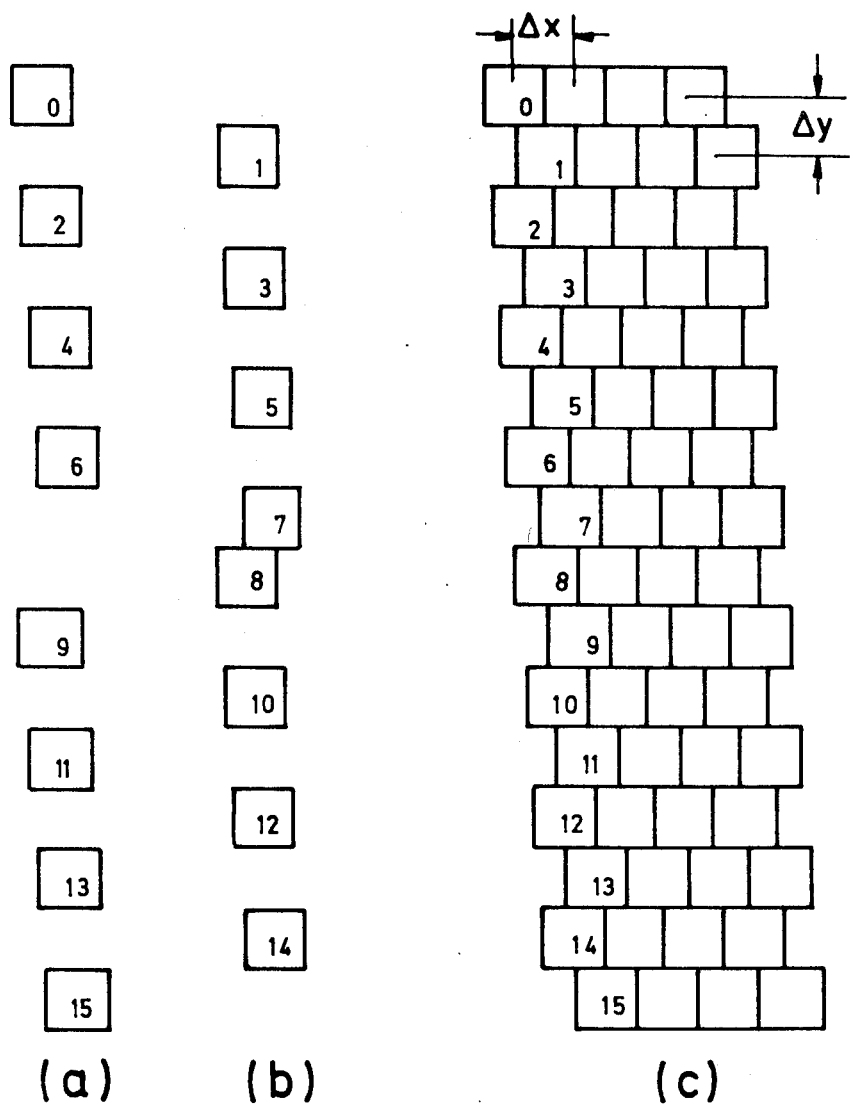
Figure 6:
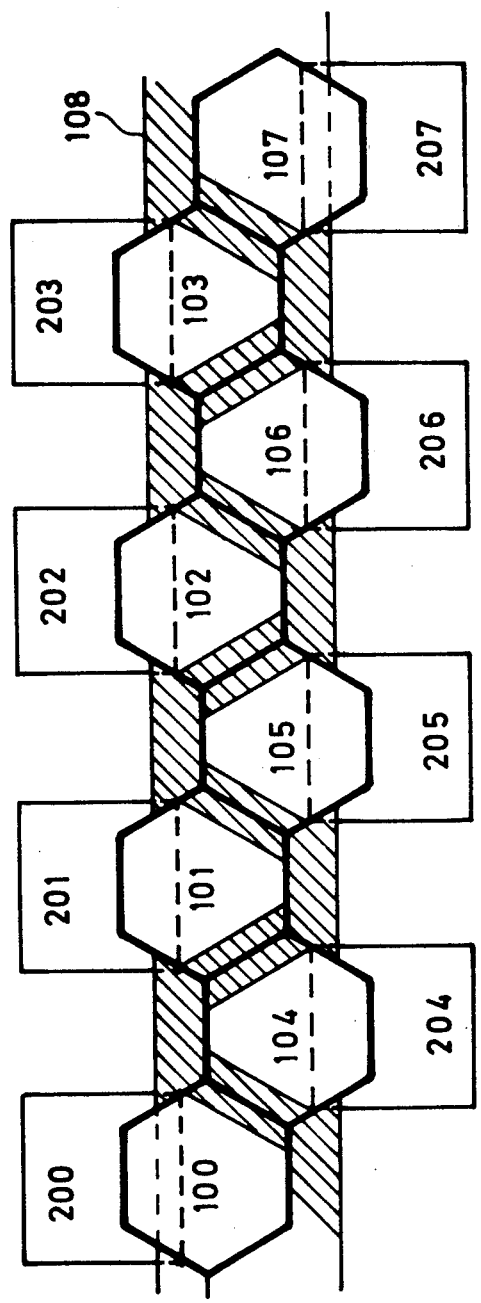

The invention will be further explained by means of the appended diagrams, wherein:

FIG. 1 is the block diagram of the apparatus for generating the hexagonal raster, FIG. 2 shows the detail of one of the circuit blocks, FIG. 3 shows the timing diagrams of the various control signals in the circuit, FIG. 4 represents the resulting scan patterns, FIG. 5 presents the detailed geometrical relations existing in the hexagonal scan generator, and FIG. 6 shows the design of an improved array of solid-state photodetectors.

FIG. 1 is the block diagram of the apparatus for generating the hexagonal scan. It consists of a counter 1, generating successive binary codes from the clock pulse A, a control signal and address decoder 2, the photodetector array 3, an analog-digital converter 4 (A/DC), and storage means 5 consisting of a known random access memory (RAM). The raster output is taken from the RAM 5.

The operation of the circuit will be explained hereinafter with specific reference to an array comprising 16 aligned detecting elements, i.e. 8 even and 8 old elements, but the same principles are valid as well for arrays of any number of elements and the modification necessary for a particular case will be obvious to an expert.

The counter will have a number of states at least equal to the number of photodetectors in the array. It will advance through these states in sequence under the action of the input clock pulse A. The various contron signals and RAM addresses required for the correct operation of the system will be obtained from the control signal and address decoder 2 whose inputs are the individual state signals at the output terminals of the counter and whose outputs are the required control signals and addresses. The control signals for the photodetector array 3 are the reset pulses for the even ($R_E$) and odd ($R_O$) half column arrays, the clock and output sampling pulses for the even ($S_E$) and odd ($S_O$) half column arrays, the RAM address code H, and the RAM read/write control pulse I. The two output terminals of the photodetector array 3 are tied together and supply the input to the A/DC whose output is the data input to the RAM G. The RAM output is the bus J.

The operation of the system will be clarified by means of the following table and FIG. 3, the timing diagram reflecting the relationships implied by the table.

| Counter state. | Binary code. | Write. | Read | |
|---|---|---|---|---|
| 0 | 0000 | 0 | 1 | The write/read control |
| 1 | 0001 | 9 | 3 | signal for the AM is |
| 2 | 0010 | 2 | 5 | the clock pulse $A_1$. A |
| 3 | 0011 | 11 | 7 | write occurs for every |
| 4 | 0100 | 4 | 9 | value of $A_1 = 1$ and a |
| 5 | 0101 | 13 | 11 | read for every value of |
| 6 | 0110 | 6 | 13 | $A_1 = 0$. |
| 7 | 0111 | 15 | 15 | |
| 8 | 1000 | 8 | 0 | |
| 9 | 1001 | 1 | 2 | |
| 10 | 1010 | 10 | 4 | |
| 11 | 1011 | 3 | 6 | |
| 12 | 1100 | 12 | 8 | |
| 13 | 1101 | 5 | 10 | |
| 14 | 1110 | 14 | 12 | |
| 15 | 1111 | 7 | 14 | |

In this table the binary code corresponds to the states of the counter outputs $A_5A_4A_3A_2$ while the write/read columns list the positions of the elements in the photodetector array whose sampled and digitised data are written into or read out of the RAM during the time that the given counter state is valid. Referring to FIG. 3, we see that a read operation takes place after a write operation.

The state of the sampled photodiode appearing at the output terminal F of the array 3 is first digitised by the A/DC 4 before being written into the RAM 5. The number of bits to which the signal is digitised will depend on the particular application, and may be as little as 1 bit, obtained by a simple black/white threshold operation or may be as much as 8 for good quality photodiode arrays. To allow for digitising time, the sampling times $S_E$ and $S_O$ precede the write times $W_E$ and $W_O$ by one half sampling period.

The examination of the table and FIG. 3 also shows that the even and odd photodetectors are sampled, digitised, and written to RAM alternately, while the odd samples are read out in sequence, followed by the even samples. If the number of elements in the photodetector array is $2^n$, during each period of $2^n$ clock pulses $A_1$ the entire photodetector array shall have been sampled, each element once, an even and an odd elements being sampled in alternation, and the samples read out in trains of $2^{n-1}$, first the train of $2^{n-1}$ odd samples, then the train of $2^{n-1}$ even samples.

It will also be observed that while the top, or first half of the even elements is being sampled, the bottom, or last half of the odd elements is being sampled, and vice versa. Thus element 9 is sampled directly after element 0 and element 1 directly after element 8. An examination of the binary codes corresponding to the even elements shows that if the elements 0,2,4,6,8,10,12,14, are renumbered 0,1,2,3,4,5,6,7, that is, are numbered from 0 to 7 in order, then the corresponding binary numbers will be found by taking the three high-order bits of the binary code that is output from the counter when the data from the corresponding sample are to be written to RAM, while the corresponding binary numbers will be found by taking the three low-order bits from the binary code that is output from the counter when the corresponding data are to be read out of the RAM. Similarly, renumbering the elements 1,3,5,7,9,11,13,15, by 0,1,2,3,4,5,6,7, we find the same relationship for the readout of these data. However, for the write of these elements, we find that the high-order bit is inverted. This is due to the fact that the bottom half of the odd half column of photodetector elements is sampled during the first half of the cycle, when the top half of the even half column is being sampled, and vice versa. This enables us to construct partial address codes for the odd and even data sequences for storage and readout from RAM in the correct sequence. It is further necessary to supply one bit that will separate the odd and even data into separate zones of the RAM. During the write cycles this additional bit will be $A_2$ which takes on opposite polarities during even and odd write cycles, and for the read cycles this will be $A_5$. We assign the code $A_5A_4A_3A_2$ to the even elements when they are being written to RAM and the code $A_4A_3A_2\overline{A_5}$ when they are being read out, the code $\overline{A_5}A_4A_3A_2$ to the odd elements on write and $A_4A_3A_2\overline{A_5}$ on read. This will have the effect of assigning even elements to even RAM addresses and odd elements to odd RAM addresses. It is understood that these address codes are the concatenation of the corresponding bits output from the counter and not the logical product of the designated variables, where the bits take on variables.

FIG. 2 represents the detailed block diagram of the address decoder which forms part of the control signal and address decoder 2. The output variables of the counter $A_2, A_3, A_4 A_5$ are connected as shown to the inputs of multiplexers 21, 22, 23, 24, where the multiplexer 21 is a 4-way multiplexer and multiplexers 22, 23, 24 are 2-way multiplexers. Variable $A_5$ is input in direct polarity to one input of multiplexer 21 and inverted to a second input of multiplexer 21 and to one input of multiplexer 24. The control inputs to the multiplexers are $A_1$ to all the multiplexers and $A_2$ to the second input of multiplexer 21. When $A_1 = 1$ the left inputs are switched to the outputs and when $A_1 = 0$ the right inputs. This controls the shift from high-order to low-order variables for the address codes between writing and reading in RAM. When $A_2 = 0$ the noninverted input of $A_5$ is connected to the output of multiplexer 21 if $A_1 = 1$ and when $A_2 = 1$ the inverted input of $A_5$ is connected to the output of multiplexer 21 if $A_1 = 1$. This controls the inversion of $A_5$ when an odd sample is being written to RAM.

The other control signals are given by the following table, where the strings of variables here are taken in the sense of logical AND gate functions.

$R_E = \overline{A_1}A_2A_3A_4A_5$
$R_O = \overline{A_1}\overline{A_2}A_3A_4A_5$
$S_E = \overline{A_1}A_2$
$S_O = \overline{A_1}\overline{A_2}$
$C_E = R_O$
$C_O = A_1\overline{A_2}A_3\overline{A_4}\overline{A_5}$ where the meanings of these control signals are defined in FIG. 3.

The geometrical effect on the resulting raster is represented in FIG. 4. FIG. 4(a) shows the geometrical arrangement of samples taken during the first half period. Since the sample from the odd element 9 is taken immediately after the sample from the even element 0 the relative motion between the scanning array and the scanned medium is very small during this time and the two samples are in effectively the same vertical column on the medium. For each successive even-odd sample pair the medium has moved slightly with the result that each successive pair is displaced by the same amount. Assuming that the relative motion of the scanning array with respect to the medium is from left to right, the result will be as shown in FIG. 4(a). Similarly, during the second half period we obtain the arrangement shown in FIG. 4(b). The entire pattern over several columns is shown at FIG. 4(c). We see that the relative motions and the scanning arrangements are such that the odd and even half columns form the spatial arrangement corresponding to a staggered scan. The slight motion between the scanning head and the scanned medium between successive odd and even samples is just the amount necessary for these samples to occur at the right positions for this staggered scan.

The geometrical relationships occuring between the centers of sampled elements in consective half columns is represented in FIG. 5. If the relative velocities of the scanning head and the scanned medium is such that the distance travelled between successive columns is given by $$\Delta x = 2\Delta y \cdot \cot 60° = 1.1547 \ldots$$

then the centers of the scanned samples will correspond to the center of the hexagons in a hexagonal raster. A small error will be present if the scanning array is aligned perfectly perpendicular to the direction of relative motion between head and medium, since the effective columns will be titled at an angle whose tangent is $\Delta x/2^n$. Since the least value of $2^n$ of practical interest is 128, this error is less than one half degree. While this error is insignificant compared to the other sources of error in the system, including the fact that the samples are not true hexagons it can be reduced to a theoretical value of zero by tilting the photodiode array in the opposite direction by the corresponding amount without altering the arrangements described here.

It will be appreciated that the circuit represented in FIGS. 1 and 2 and described here is given by way of example and the designer may make modifications as a function of available microcircuits and technology and the well known tradeoffs between cost and performance. As an example, the control signal and address generator 2, represented in part in FIG. 2, can be implemented by a single ROM (read-only memory) which contains at successive addresses the successive control signals and addresses required for the correct operation of the system. In this case the counter will have to have $2^{n+1}$ states, since this is the number of discrete clock times as may be seen from FIG. 3. Other modifications will be evident to the designer without altering the basic invention as described here.

The principle of interdigitated half arrays can be used to construct a solid-state photodetector array that will furnish a true hexagonal scan, thereby eliminating the defects noted with reference to FIG. 5, and enabling a substantial simplification of the control and readout circuitry. This embodiment of the invention will now be explained with reference to FIG. 6, taking the well-known CCD (Charge-Coupled Device) technology as the basis. In the known COD photodetector arrays, as in the MOS photodiode arrays, the arrangement of the photodetector has been as noted above, a single row of square or rectangular cells. In the device constructed according to the invention the two interdigitated half-columns are offset, in the manner shown in FIG. 6, and the cells given the hexagonal shape represented in the drawing. For example, elements 100, 101, 102, 103 will be part of the even half column, and elements 104, 105, 106, 107 will be part of the odd half columns. The hatched area 108 represents the serpentine channel stop as required for the correct functioning of CCD devices in one implementation. It will be appreciated that this arrangement has the double advantage of larger photodetector elements for the same length of semiconductor, while making the connection to each half-column simpler to lay out, more room being offered between elements of the same half-column. It will likewise be appreciated that all of the timing and control devices required in the above-described embodiment, using standard components, can be integrated onto the same semiconductor substrate (chip) as the photodetector array.

In particular, the transfer between photodetector elements 100–103 and the output transfer line elements 200–203, on the one hand, and the photodetector elements 104–107 and the output transfer line elements 204–207 on the other hand, is simultaneous, as in existing line arrays, while the readout from the line 200–203 is consecutive and complete before the readout from the line 204–207, which is consecutive and complete before the next simultaneous transfer operation, thus complying with the requirements of sequences $J_E$ and $I_O$ of FIG. 3.

It will be obvious to a person of the art that the same principle can be applied to the other class of solid-states monolithic photodetector array, the MOS photodiode array.

I claim:

1. An image scanning method, comprising:
providing a linear array of intercalated odd and even detectors arranged in a column,
displacing said array over said image transversely to the direction of alignment of the detectors in said column, repeatedly serially sampling element signals from said detectors, each indicative of the intensity detected by a corresponding detector over an element part of the image, each odd detector of the array being sampled alternatively with an even detector, but several odd detectors being sampled before the first even detector adjacent to a sampled odd detector is sampled,
and serially transferring into an image signal alternatively a first sequence of said element signals sampled from said odd detector and a second sequence of said element signals sampled from said even detectors,
wherein the sampling of the element signals is timely controlled so that the time interval between sampling adjacent odd and even detectors is half the time period for sampling the complete array.

2. A method according to claim 1, wherein each sampling period comprises sampling in sequence first each successive odd detector of a bottom half column alternately with each successive even detector of a top half of said intercalated odd and even detectors in said array, and second each successive odd detector of said top half column alternatively with each successive even detector of said bottom half-column.

3. A method according to claim 2 wherein said odd detectors are aligned in the array with said even detectors, all said detectors being equally spaced.

4. An image scanning method, comprising providing a linear array of intercalated odd and even detectors arranged in a column, displacing said array over said image transversely to said column, repeatedly serially sampling element signals from said detectors, each indicative of the intensity detected by a corresponding detector over an element part of the image, said element signals being sampled in sequence first from several odd detectors in a bottom part of said column and from several odd detectors in a top part of said column, then from several odd detectors in a top part of said column and from several even detectors in a bottom part of said column,
serially transferring into an image signal alternately a sequence of said element signals sampled from said odd detectors and a sequence of said element signals sampled from said even detectors
wherein the sampling of the element signals is timely controlled so that the time interval between samplings adjacent odd and even detectors is half the time period for sampling the complete array.

5. An image scanning device comprising:
a linear array of light sensitive detectors aligned in a column comprising intercalated odd and even detectors,
means for displacing said array over an image transversely to the direction of alignment of the detectors in said column,
means for repeatedly sampling element signals from said detectors, each indicative of the light intensity detected by a corresponding detector over an element part of the image, said element signals being sampled in series alternately from an odd detector and from an even detector,
means for serially transferring into an image signal alternately said element signals sampled from said odd detectors in sequence and said element signals from said even detectors in sequence,
and timing means for controlling the sampling of the element signals so that the time interval between sampling adjacent odd and even detectors is half the time period for sampling the complete array.

6. A device according to claim 5, wherein said even detectors are laterally offset with respect to said odd detectors, the successive adjacent detectors in the array being formed by adjacent hexagonal light sensitive element areas of said array separated by a serpentine channel stop.

7. A device according to claim 5, comprising means for sampling in series each successive odd detector of a bottom half of said column alternately with each successive even detector of a top half of said column and each successive odd detector of said top half alternately with each successive even detector of said bottom half.

8. A device according to claim 5, wherein said odd detectors are aligned with said even detectors.

* * * * *